(No Model.) 4 Sheets—Sheet 2.
J. W. ADAMS.
BOLT THREADING MACHINE.

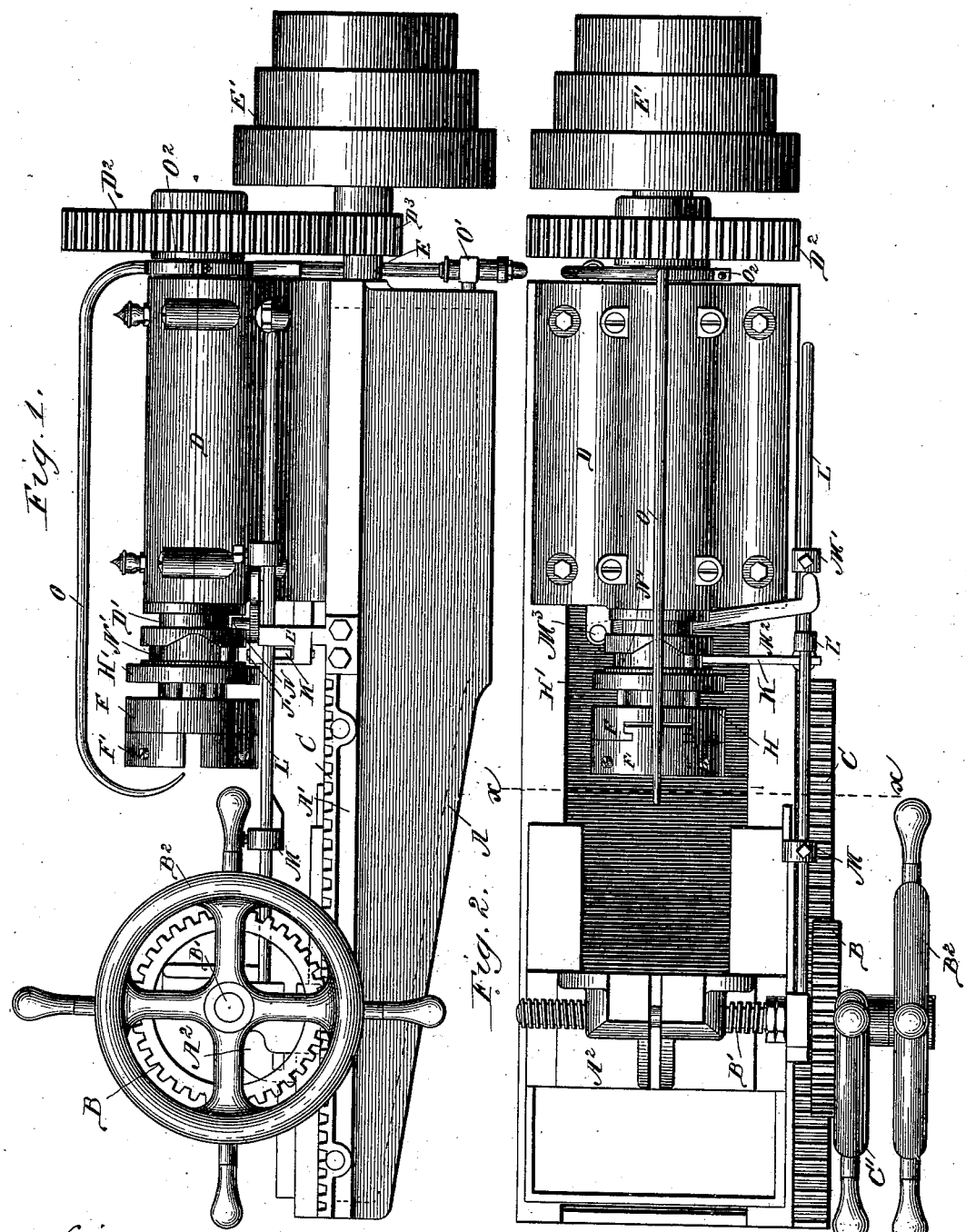

No. 357,300. Patented Feb. 8, 1887.

Witnesses.
N. Rossiter
Will R. Onohundro

Inventor:
James W. Adams
By Jno. L. Elliott
Atty.

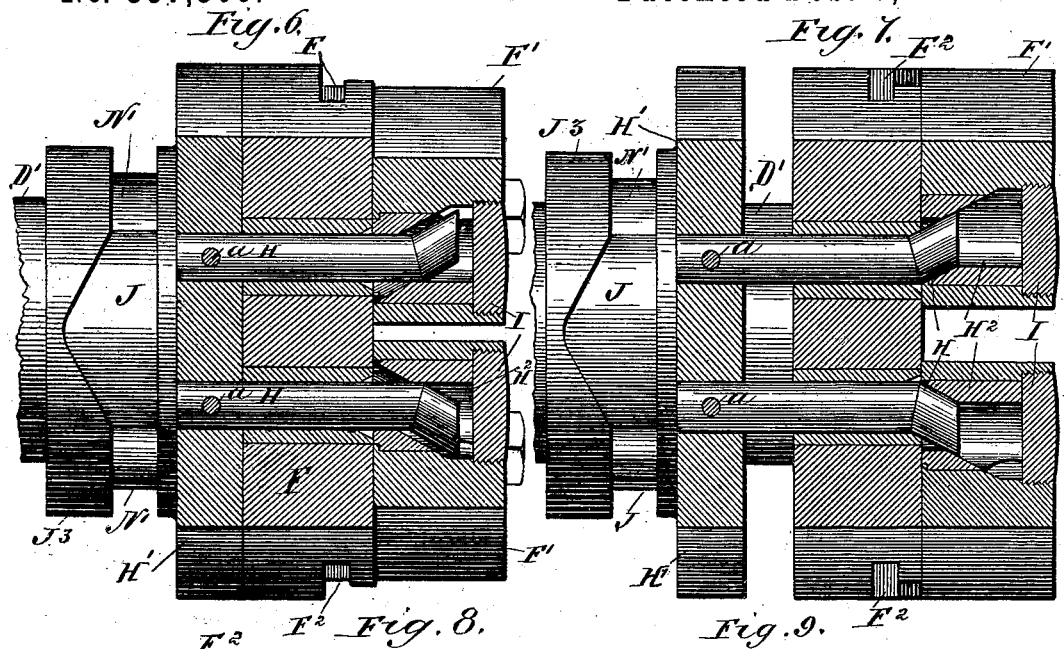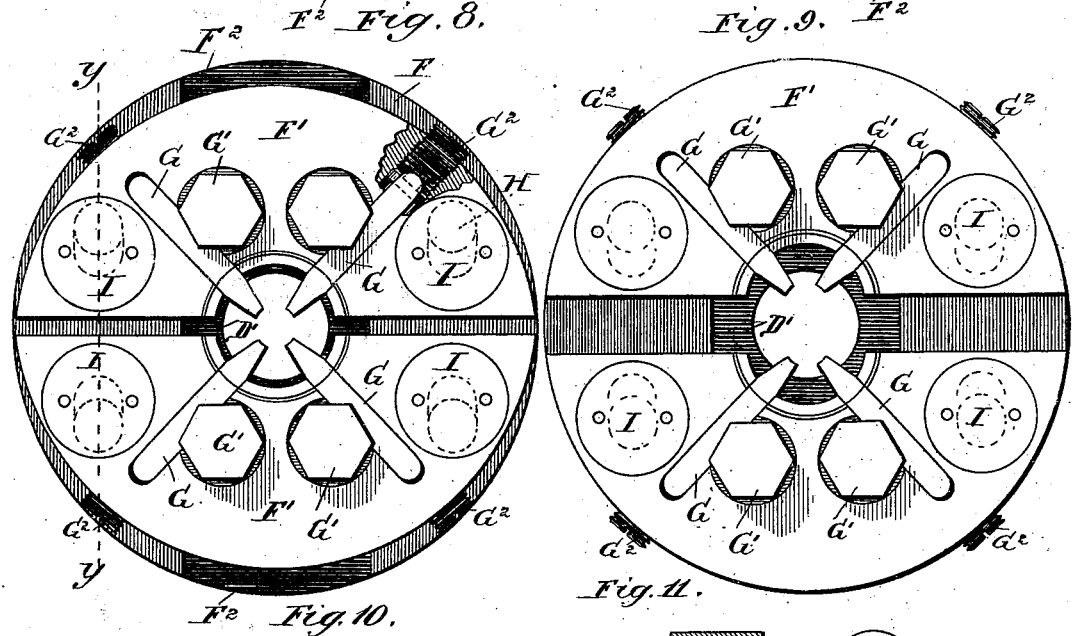

(No Model.) 4 Sheets—Sheet 4.
J. W. ADAMS.
BOLT THREADING MACHINE.
No. 357,300. Patented Feb. 8, 1887.
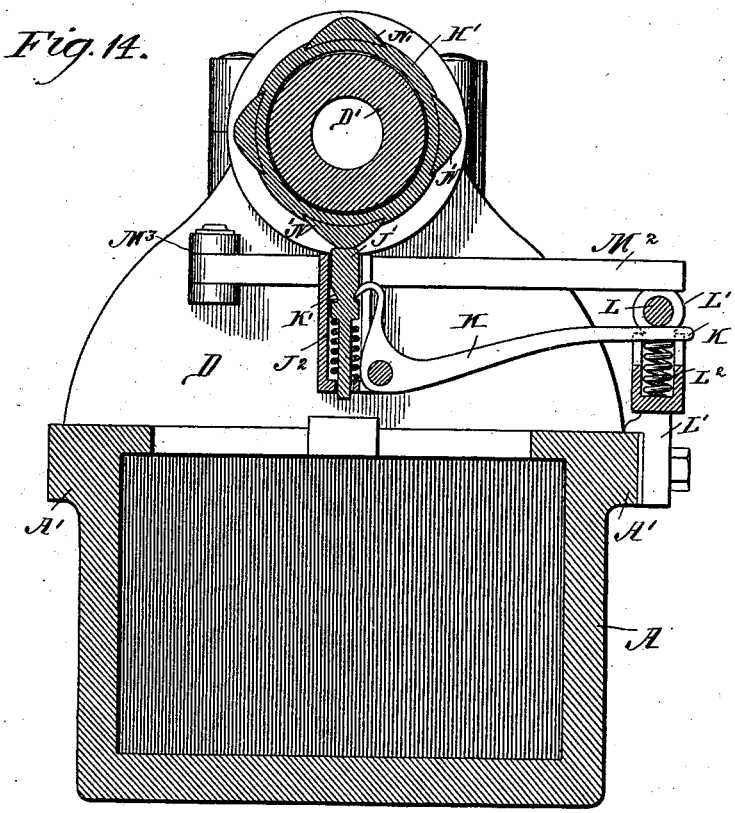
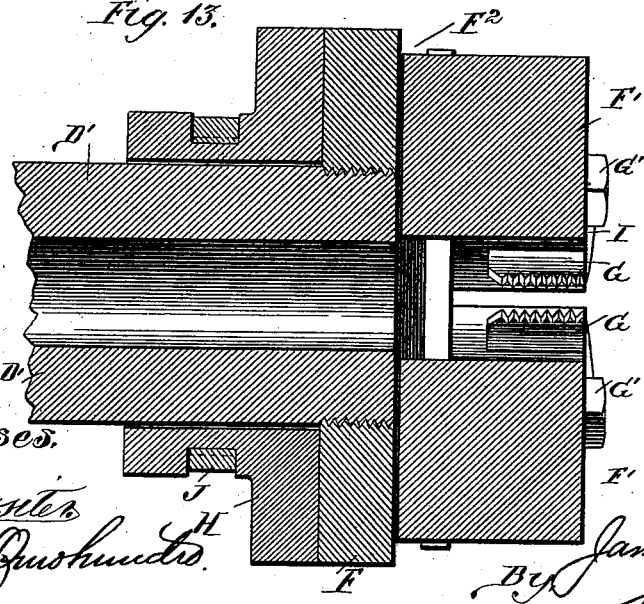
Witnesses.
W. Rossiter
Will P. Bushnell
Inventor
James W. Adams
By Jno. J. Elliott
Atty.

UNITED STATES PATENT OFFICE.

JAMES W. ADAMS, OF CHICAGO, ILLINOIS.

BOLT-THREADING MACHINE.

SPECIFICATION forming part of Letters Patent No. 357,300, dated February 8, 1887.

Application filed September 27, 1886. Serial No. 214,587. (No model.)

*To all whom it may concern:*

Be it known that I, JAMES W. ADAMS, a citizen of the United States, residing in Chicago, county of Cook, and State of Illinois, have invented certain new and useful Improvements in Bolt-Threading Machines, of which the following is a specification.

This invention relates to improvements in bolt-threading machines in which a revolving split head or die-carrier is automatically actuated to advance the threading dies or chasers toward or withdraw them from the bolt on a line radial to the line of rotation of the head and the dies without stopping or reversing the machine, but is more particularly designed as an improvement on the invention set forth in United States Letters Patent No. 318,678, granted me May 26, 1885.

The prime object of this invention is to simplify the construction of the machine set forth in said Letters Patent, by dispensing with a number of parts of said machine, and at the same time accomplish all the objects and results thereof.

Another object is to so construct the machine that the power thereof may be utilized for positively opening and closing the head during the continuous operation of the machine, whereby springs or other tension devices for accomplishing one or both of these objects may be dispensed with.

Another object is to utilize the locking-pins for opening and closing the split head, whereby separate and distinct tongues, liable to fracture and injury, and slotted external guide-plates for this purpose are dispensed with, and the opening and closing devices are concealed within the head and so inclosed that no dust can lodge or accumulate between the working-faces of said opening and closing device and the head; to provide means for utilizing the power of the machine to positively open and close the head during the continuous operation of the machine, whereby the automatic operation of these parts is insured at the proper time; to provide a device for adjusting the dies in a radial line both toward and from the axis of the head, and to provide other details of construction, all as hereinafter described and illustrated in the accompanying drawings, in which—

Figure 3:
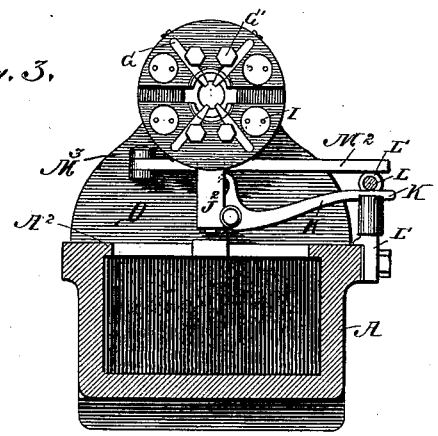
Figure 4:
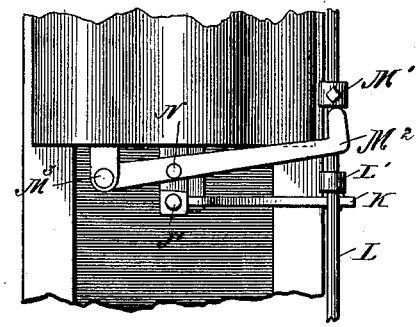
Figure 5:
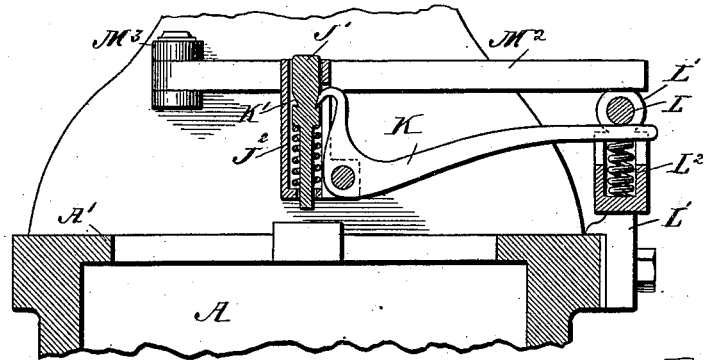

Figure 1 represents a side elevation of a bolt-threading machine embodying my invention; Fig. 2, a plan view thereof; Fig. 3, a transverse vertical section thereof on line $x\ x$, Fig. 2; Fig. 4, a detail plan view of the devices employed for operating the mechanism for opening and closing the head; Fig. 5, an enlarged detail transverse section thereof; Fig. 6, a vertical section through the revolving head on line $y\ y$, Fig. 8, showing the position of parts when the head is closed; Fig. 7, a similar view showing the head open; Fig. 8, a face view of the head closed; Fig. 9, a similar view of the head open; Fig. 10, detail views of the key employed for opening, closing, and locking the head; Fig. 11, detail views of the steel bushing set in the head in which the key operates; Fig. 12, a detail view showing the connection between the dies and the adjusting-screws thereof; Fig. 13, a central vertical section through the head, and Fig. 14 an enlarged transverse section through the spring-pin and cam-collar for operating the same.

Similar letters of reference indicate the same parts in the several figures of the drawing.

The general operation of this machine is almost identical with that of the patent aforesaid, although the mechanisms employed for producing the same are essentially different, the chuck-carriage carrying the blank bolt being moved forward by hand-power until the free end of the blank is engaged by the closed revolving head, after which the operation of cutting the thread upon the blank serves to draw the chuck-carriage forward. This further forward movement of the said carriage is utilized for the purpose of actuating the mechanism employed for automatically opening the head and releasing the bolt when a thread of sufficient length has been cut thereon, permitting the removal, or, rather, withdrawal, of said bolt by moving the chuck-carriage backward to its first position, where the threaded bolt is removed and a blank inserted, upon which the same operation is repeated.

Referring by letter to the accompanying drawings, A indicates a frame or casting for supporting the operating parts of my machine, hollow in the upper part thereof, so as to form an oil-receptacle in which to catch and retain the oil fed to the bolts during the operation of cutting the thread, and from which receptacle the oil is drawn off and again fed to the bolts, in the usual manner, as will hereinafter be explained. The upper surface of this casting A forms a table or guideway, A', upon which rides the chuck-carriage A², for feeding the bolt-blank to the cutter-head, the backward and forward travel of which is accomplished by means of a cog-wheel, B, sleeved upon the screw-shaft B', employed for opening the chuck-jaws between a bearing therefor on the carriage and the hand-wheel B², for operating the same, which cog-wheel engages a toothed rack, C, rigidly secured to or cast upon the table, the said cog-wheel, for convenience of operation, being provided with a segment hand-wheel, C', by means of which the chuck-carriage may be readily moved back and forth upon the table.

Upon the rear end of the table is mounted a casing or head-block, D, of any desirable configuration, forming a bearing for a hollow shaft, D', extending longitudinally therethrough, to which a rotary motion is imparted by means of a cog-wheel, D², mounted upon the rear end of said shaft, and meshing with a smaller cog, D³, mounted upon a supplemental shaft, E, to which power is applied by means of a cone-pulley, E', secured on the outer end of said shaft.

Screwed or otherwise rigidly secured to the opposite end of the hollow shaft D' is a head-block, F, upon the face of which away from the shaft lie the split heads or die-carriers F', the latter being held in position by means of a dovetail connection, F², between said split heads and the head-block. When mounted upon the end of the shaft D, the face of the head-block and forward end of the shaft are flush, in order that the die-carriers may slide freely toward and away from the axis of said shaft during the operation of opening and closing the split head, in which movement said split head is guided by the dovetail tongue-and-groove connection between the split head and the head-block. As in my said patent, the die-carriers, when taken together, are circular in cross-section and are provided with radial slots in the outer faces thereof, in which work the dies G, rigidly secured in their respective slots by the short bolts or set-screws G', and adjustable longitudinally toward or away from the axis of rotation by means of screws G², working through corresponding screw-threaded openings in the split head or die-carriers, and having a swivel connection with the outer end of the dies, as clearly illustrated in Fig. 12. These screws, as before stated, furnish the means for adjusting the dies to the desired size of bolt to be threaded, the swivel connection between the die and screw enabling the moving of the die either toward or away from the bolt, and the set-screw G' furnishes the means for retaining the dies rigidly in position after being properly adjusted, to further which end they are slightly countersunk in the face of the die-carriers, as shown in the drawings.

For the purpose of opening and closing the split head I employ the angular keys H, rigidly secured at the end thereof, by means of pins o, or other suitable devices, to a flanged sleeve or collar, H', loose upon the hollow shaft D', the means for reciprocating which will be described in detail farther on.

The angular keys H are preferably formed circular in cross-section, and consist of a main straight portion or body and an angle portion, the end being bent or otherwise formed at an oblique angle to the main body, so as to form double inclines on the opposite sides thereof. The straight portion of these keys work loosely through the head-block F at any desired point between the inner and outer peripheries thereof, but preferably at about the point indicated by dotted lines in Figs. 8 and 9, suitable bushing being provided at this point, so that they may be renewed when sufficiently worn, and thus reduce the cost of repair of the machine.

The free inclined ends of the keys project into recesses formed in the inner faces of the split head, having walls inclined to correspond with the end of the keys, which recesses, for convenience of substitution in case of wear, may be formed in bushings H², set into recesses extending partly or entirely through the die-carriers, the forward ends of which are closed by screw-plugs I, so as to protect the wearing-surfaces from dust, and also to furnish a means of access to the keys when, from any cause whatever, it should be found desirable to remove the keys. While the operation of these keys in general is similar to that of the device employed in my said patent for performing the same operation, they are essentially different both in detail of construction and directly the reverse in its operation, and all of the working parts are concealed from observation and protected from the possibility of lodgment thereon of dust and dirt, thus promoting the durability of the parts. Furthermore, the tongue or key in this head is movable, and operates upon the inclined walls of the recesses in the die-carriers to open and close the head; and it will be observed that with this construction the key or tongue may have a configuration combining strength and utility not practicable in the old form, and, in addition thereto, the strain upon the key is greatest where the strength is greatest—that is, at the farthest part of the incline, away from the outer end thereof—so that the liability to fracture the end thereof that exists in the prior construction is entirely avoided.

When the head is closed, a short portion of the straight part of the key is projected beyond the inclined walls of the recesses in the die-carrier to and in engagement with a straight portion thereof, and by this engagement locks and prevents the head from opening until the key is withdrawn. Thus it will be seen that these keys not only perform the functions of the tongue and double incline for opening and closing the head, but subserve the further purpose of lock-pins, and hence supplemental pins are not at all necessary in view of the strength of the keys, owing to the present location, construction, and operation of said keys.

From the foregoing it will be understood that the opening and closing of the head is accomplished by the longitudinal reciprocation of the flanged sleeve or collar H' upon the shaft D', and to this end I have provided a cam-groove, J, in the periphery of said collar, into which is designed to project and work a spring-seated pin, J', held in a suitable bracket or casting, J², cast with or otherwise rigidly secured to and projecting a short distance from the front face of the casting D below the said collar, as more clearly shown in Fig. 1. When the head is closed, as shown in Fig. 6—that is to say, when the collar is at the limit of its movement toward the head—the spring-seated pin registers with the plain or smooth surface J³ of the collar H', but is not in contact therewith, because it is held down within its casing by means of a spring-catch or hook-lever, K, pivoted upon the casing J², the hook end of which engages an annular groove formed upon the said pin just below the upper end thereof. During all this time the heads are supposed to be closed and engaged in the operation of threading a bolt, during and by means of which operation the chuck-carriage is drawn forward by the feed of the blank to the dies, carrying with it a rod, L, rigidly secured at one end to the side thereof, the free end of which works loosely through a guide-plate, L', rigidly secured to the table A'. The free end of the lever-catch K also works through the plate L' beneath, and is prevented from rising too high by the rod L, against which it is held by a spiral spring, L², seated in a socket provided for its reception in the plate L', and at the proper point of the forward travel of the chuck-carriage, when the bolt has been threaded a sufficient length, a stop, M, rigidly but adjustably mounted on the rod L, comes in contact with the free end of the lever-catch K, which, riding upon the inclined surface thereof, is depressed sufficiently to release the spring-seated pin from its other hooked end, when the said pin immediately rises into contact with the collar H', and at the proper point shoots into that portion of the cam-groove in said collar extending into the plain portion J³ thereof, whereupon the inclined walls of said cam-groove cause the collar to immediately slide longitudinally upon the shaft D', carrying with it the keys H, thereby forcing the split head to open and release the bolt. At this time, of course, the forward travel of the chuck-carriage ceases, by reason of the release of the bolt by the cutting-dies, which, as before stated, imparts to the carriage its forward movement, and the carriage is free to be returned to its first position by the hand mechanism hereinbefore described; but just before reaching the end of its backward travel a stop, M', mounted on the rod L some distance forward of the stop M, comes in contact with the free end of a lever, M², pivoted at M³ to the casing D, and provided with a pin, N, adapted and arranged to come in contact with the rear face of the collar H', thus causing the said collar to slide forward upon the shaft D' and close the head. However, before the head is closed, the spring-pin for opening the same must be withdrawn from engagement with the cam-groove in the collar; otherwise the collar could not be slid forward, or if slid would be immediately returned; and to accomplish this I have provided one or more cams, N', located in the straight portion of the cam-groove J, one of which, during the continuous operation of the machine, is designed to ride down and force the pin within its casing until the groove therein is engaged by the lever-catch, when the said pin will be retained in its depressed position until the lever-catch is again operated to release it by the forward travel of the chuck-carriage in feeding a bolt to the head during the cutting operation.

A machine constructed after the manner just described has numerous advantages over the prior constructions, prominent among which are the strength and durability of the parts, which are enhanced by the protection of the operating-faces thereof from the possibility of the lodgment of dust and dirt thereon, particularly in the construction of the head; and an equally important advantage arises from the employment of the power of the machine to positively open and close the head, dispensing with any spring-tension or other indirect or yielding mechanism for performing either one of the operations, thereby reducing the number of the parts, and consequently the cost of manufacture, and promoting the simplicity of the machine as a whole to a maximum degree.

Referring again to the mechanism for operating the chuck-carriage, it is proper to add that an important advantage is gained by sleeving the actuating-gear of said carriage upon the screw-shaft employed for opening and closing the chuck, for by so sleeving said gear the same shaft is utilized in the manipulation both of the chuck-jaws and the carriage, and the actuating devices of said jaw and carriage are not only more convenient of manipulation by the operator, but he is enabled to produce a longer stroke of the carriage by a single movement than is practically possible when the carriage is actuated by a lever and cog below the carriage and working upon an axis independent of the screw-shaft for the jaws, as in my former patented construction.

The usual detachable chip-pan is supported and carried upon the chuck-carriage, in which to catch the chips and shavings, and also the oil supplied to the bolt during the threading operation, a constant feed of oil to the bolt being supplied from an overhanging pipe, O, connected with a pump, O', operated by an eccentric, O², on the shaft D' between the casing D and gear-wheel D², which pump draws its supply from the reservoir in the upper part of the frame A, into which the oil supplied to the bolts drains through the bottom of the chip-pan.

I am aware that prior to my invention machines for a similar purpose to mine have had keys rigidly secured to the die-carriers and provided with angular ends engaging corresponding angular recesses in the sliding collar, both of said keys and the recesses in the die-carriers having two straight portions in different planes connected by an inclined or angular portion; but in a construction of this character the strain on the keys in opening and closing the split head or die-carriers is not only centered in the collar, but said keys exert a leverage on the die-carriers tending not only to cause them to bind on the head-block, but to strain the keys and require an objectionable degree of power to actuate the die-carriers. Furthermore, in the construction referred to the form of angle of the keys and recesses is such as to render the device practically inoperative, the inclined walls of the recesses necessarily opposing each other, as also do the walls of the straight portions, these straight portions of the keys and recesses, which are designed to lock the dies against accidental movement at each end of their stroke, serving this purpose so effectually that when once the dies are separated and locked by the impinging of the aforesaid straight surfaces against each other they cannot be again closed, for the lock cannot be broken without fracturing the keys. With my device, however, all of these objections are obviated, the inclined walls of the recesses opposing the straight portions in such manner that a dead-lock between the moving parts could not possibly occur, even were keys having two straight portions employed, for by reason of this construction the ends of the straight portion would be rendered absolutely useless, and therefore perform no function, and the strain upon the keys being centered in a direct line with the resistance—that is, in the die-carriers—any undue leverage on the keys is therefore effectually avoided and the die-carriers rendered operative by the minimum power.

Having described my invention, what I claim, and desire to secure by Letters Patent, is—

1. In a bolt-threading machine, a sliding support and the die-carriers, said die-carriers being provided with recesses the walls of which are angular, in combination with keys rigidly secured to the said sliding support and provided with angular ends engaging the angular recesses in the die-carriers, whereby the strain on said keys is centered in the die-carriers during the operation of closing and opening the head, substantially as described.

2. In a bolt-threading machine, the sliding collar and the die-carrier, one of said members being provided with recesses having double inclined walls and a straight portion, the inclined walls being opposed by the straight portion, in combination with keys rigidly secured to the other member and provided with angular inclined ends corresponding with and engaging said recesses, substantially as described.

3. In a bolt-threading machine, the sliding collar and the die-carriers, said die-carriers being provided with recesses having double inclined walls and a straight portion, the inclined walls being opposed by the straight portion, in combination with keys rigidly secured to the collar and provided with angular ends engaging the recesses in the die-carriers, substantially as described.

4. In a bolt-threading machine, the die-carriers provided with recesses in the inner faces thereof, having double inclined walls and a straight portion, and means for supporting and guiding said die-carriers, in combination with keys having angular or inclined ends corresponding with and engaging the recesses in said carriers and means for longitudinally reciprocating said keys, substantially as described.

5. In a bolt-threading machine, a rotating shaft and head-block mounted on the end thereof, the die-carriers working on the face of said head-block and provided with recesses on the inner faces thereof, having double inclined walls and a straight portion, and a connection between said carriers and the head-block, in combination with keys or pins having bent or inclined ends engaging the recesses in the die-carriers and means for longitudinally reciprocating said keys, substantially as described.

6. In a bolt-threading machine, a rotating shaft and head-block mounted on the end thereof, the die-carriers working on the face of said head-block and provided with recesses in the inner faces thereof, having double inclined walls and a straight portion, and a connection between said carriers and the head-block, in combination with a sliding collar mounted on said shaft, keys or pins secured to said collar, working freely in said head-block and having bent or inclined ends engaging the recesses in the die-carriers, and means for longitudinally reciprocating said carrier, substantially as described.

7. In a bolt-threading machine, a rotating shaft, a head-block mounted on the end thereof, the die-carriers working in the face of said head-block and provided with recesses on the inner faces thereof, having double inclined walls and a straight portion, and a connection between said carriers and the head-block, in combination with a sliding collar mounted on the said shaft, keys or pins secured to said collar, working freely in said head-block and having bent or inclined ends engaging the recesses in the die-carrier, an annular cam-groove on said collar, a spring-seated pin for engaging said groove, and a guide and support for said pin attached to a stationary portion of the frame, substantially as described.

8. In a bolt-threading machine, the rotating shaft and a sleeve or collar sliding thereon, provided with an annular cam-groove, in combination with a spring-seated pin for engaging said groove and a guide and support for said pin attached to a stationary portion of the frame, substantially as described.

9. In a bolt-threading machine, the rotating shaft and a sleeve or collar sliding thereon provided with an annular cam-groove, in combination with a spring-seated pin for engaging said groove, a stationary support therefor, and a catch device for holding said pin free from contact with the collar, substantially as described.

10. In a bolt-threading machine, the rotating shaft and a sleeve or collar sliding thereon provided with an annular cam-groove, in combination with a spring-seated pin for engaging said groove, a stationary support therefor, a catch device for holding said pin when depressed, and radial cams or projections on said collar for depressing said pin, substantially as described.

11. In a bolt-threading machine, the rotating shaft, a sleeve or collar sliding thereon provided with an annular cam-groove, a spring-seated pin for engaging said groove, and radial cams or projections on said collar for depressing the pin, in combination with a lever-catch for holding said pin when depressed and means for releasing said catch, substantially as described.

12. In a bolt-threading machine, the rotating shaft, a sleeve or collar sliding thereon provided with an annular cam-groove, a spring-seated pin for engaging said groove, radial cams or projections on said collar for depressing the pin, and a lever-catch for holding said pin when depressed, in combination with the chuck-carriage, a rod rigidly secured thereto, and a stop mounted on said rod for depressing the free end of the lever-catch and releasing the said pin, substantially as described.

13. In a bolt-threading machine, the rotating shaft, a sleeve or collar sliding thereon provided with an annular cam-groove, a spring-seated pin for engaging said groove, radial cams or projections on said collar for depressing the pin, a lever-catch for holding said pin when depressed, and a lever pivoted at one end and bearing against the collar intermediate the ends thereof, in combination with the chuck-carriage, a rod rigidly secured thereto, and stops mounted on said rods adapted to engage the free ends of said lever and the lever-catch alternately during the backward and forward travel of said carriage, substantially as described.

14. In a bolt-threading machine, the sleeve provided with an annular cam-groove, the spring-seated pin, cams for depressing said pin, and the lever-catch, in combination with a rod actuated by the chuck-carriage and provided with a stop engaging the lever-catch, a guide for said rod, and a spring-seat for the free end of said catch, substantially as described.

15. In a bolt-threading machine, the supporting-frame, the guideway or table thereof, and a toothed rack cast with or otherwise rigidly secured to said table, in combination with a cog-wheel loosely mounted on the screw-shaft of the chuck-carriage engaging said rack and a hand-wheel or lever secured to said cog-wheel, substantially as described.

16. In a bolt-threading machine, the supporting-frame, the guideway or table thereof, and a toothed rack secured thereto, in combination with the chuck-carriage, the movable jaws thereof, the screw-shaft for operating said jaws, and a cog-wheel loosely mounted on said shaft engaging the rack and provided with a hand-wheel or lever secured thereto, substantially as described.

JAMES W. ADAMS.

Witnesses:
W. W. ELLIOTT,
WILL R. OMOHUNDRO.